(12) United States Patent
Smart (10) Patent No.: US 6,247,885 B1
(45) Date of Patent: Jun. 19, 2001

(54) APPARATUS FOR LOADING, TRANSPORTING, AND STACKING BALES

(75) Inventor: Randall C. Smart, Atwood, CO (US)

(73) Assignee: Justice Enterprises, Inc., Sterling, CO (US)

( * ) Notice: Subject to any disclaimer, the term of this patent is extended or adjusted under 35 U.S.C. 154(b) by 0 days.

(21) Appl. No.: 09/162,882

(22) Filed: Sep. 29, 1998

Related U.S. Application Data (63) Continuation-in-part of application No. 08/857,412, filed on May 16, 1997, now Pat. No. 5,813,814.

(51) Int. Cl.$^7$ .................................................. A01D 90/08
(52) U.S. Cl. ........................................ 414/111; 414/789.7
(58) Field of Search .................... 414/111, 789.7, 414/409, 486, 555, 24.5

(56) References Cited

U.S. PATENT DOCUMENTS

| | | | |
|---|---|---|---|
| 4,227,844 | * 10/1980 | Love | 414/24.5 |
| 4,257,732 | * 3/1981 | Staffanson | 414/703 |
| 4,329,101 | * 5/1982 | Green et al. | 414/24.5 |
| 4,329,102 | * 5/1982 | Gray | 414/24.5 |
| 4,498,829 | * 2/1985 | Spikes | 414/24.5 |
| 4,952,111 | * 8/1990 | Callahan | 414/111 |
| 4,971,504 | * 11/1990 | Klompien | 414/24.5 |
| 5,059,081 | * 10/1991 | Brown et al. | 414/408 |
| 5,320,472 | * 6/1994 | Matlack et al. | 414/24.5 |
| 5,584,637 | * 12/1996 | Jensen, Sr. | 414/24.5 |
| 5,662,449 | * 9/1997 | Krinhop | 414/24.5 |
| 5,695,311 | * 12/1997 | Miguel et al. | 414/111 |
| 5,813,814 | * 9/1998 | Smart | 414/111 |
| 5,865,589 | * 2/1999 | Reyher et al. | 414/24.5 |
| 5,938,392 | * 8/1999 | Duck | 414/24.5 |
| 5,975,824 | * 11/1999 | Hostetler | 414/24.5 |
| 6,019,562 | * 2/2000 | Cheatham | 414/24.5 |

* cited by examiner

*Primary Examiner*—Douglas Hess
(74) *Attorney, Agent, or Firm*—John E. Reilly (57) ABSTRACT

A wheeled vehicle for loading and unloading bales of hay onto and from a transportation bed includes a roller assembly cooperating with a chain drive and push plate to advance each bale or stack of bales rearwardly along the truck bed, and stabilizer arms on opposite sides of the bed have lower ends which are mounted substantially within the profile of the bed for tilting movement between a substantially upright position away from engagement with the bales and a convergent position compressed against the sides of the bales when the bed is tilted to unload the bales onto the ground.

14 Claims, 7 Drawing Sheets

APPARATUS FOR LOADING, TRANSPORTING, AND STACKING BALES

CROSS REFERENCE TO RELATED APPLICATION

This application is a continuation-in-part application of Ser. No. 857,412, filed May 16, 1997 for APPARATUS FOR LOADING TRANSPORTING AND STACKING BALES by Randall C. Smart now U.S. Pat. No. 5,813,814.

BACKGROUND AND FIELD OF THE INVENTION

The invention relates to apparatus for manipulating large bales, especially bales of hay, and more particularly to a novel and improved self-contained, self-propelled, apparatus for loading, transporting and stacking baled hay.

Considerable effort has been devoted over time to the development of apparatus for quickly and efficiently loading transporting, and unloading baled hay. The need for mechanized apparatus to accomplish these tasks has accelerated as the standard size, and thus weight, of hay bales has increased. Formerly, a typical bale of hay could be lifted and manipulated by a single physically strong individual. More recently, and for efficiency's sake, hay frequently is compressed and bound in bales measuring four feet on a side and eight feet long—bales so heavy and bulky that powered, mechanized loading and unloading is necessary.

Also increasingly common is the practice of storing and using baled hay in locations substantially remote from the fields where the hay was grown, giving rise to a need for efficient means for loading baled hay in the field and transporting the bales a considerable distance to storage. Also, the hay occasionally is used in disparate locations removed from the point of storage, compelling the re-transportation of stacked bales from storage to the points of consumption.

U.S. Pat. No. 5,320,472 to Matlack et al. discloses a bale loading, transporting and unloading device incorporating a fork having tines with which to stab a hay bale and lift it under hydraulic power to an elevated position, from which the bale is supposed to roll under the force of gravity onto an inclined transportation bed. The bales are unloaded by dropping a tailgate on the bed and allowing the bales to slide or roll from the bed by force of gravity. Densely compacted bales, however, are difficult to spear and may be pushed along the ground rather than impaled. Also, no controlled means are provided for reliably removing the bale from the tines of the fork.

U.S. Pat. No. 4,971,504 to Klompien shows a bale handling trailer adapted to be towed in an offset position to the side and behind a tractor. The device includes a forklift type of cradle with which to lift bales from the ground onto the trailer bed. The bed is tiltable from a horizontal position to a vertical position for unloading. The device apparently is unable to stack bales more than one layer deep upon the bed. Additionally, acceptably efficient operation of the Klompien device unrealistically requires that the bales be aligned in neat rows in the field, as each bale must be lined up with the offset-towed trailer in order to be in position for loading.

U.S. Pat. No. 4,952,111 to Callahan teaches a bale pick up and stacking device incorporating bale arms with which to grasp the sides of a bale, and lengthy pick up arms with which the bale is lifted by hydraulic power up and over an operator cab to be dropped, with little apparent guidance or control, upon an accumulator bed.

U.S. Pat. No. 4,329,102 to Gray shows a trailer apparatus including a winch-and-cable system for pivoting a bale cradle to lift round bales from the ground astride the trailer.

U.S. Pat. No. 4,329,101 to Green et al. discloses a bale handling apparatus employing hydraulically powered arms to grab cylindrical bales and pivot them into position for a rolling deposition upon a tiltable bed. The Green et al. device has marginal, if any, utility for loading and unloading rectangular bales.

A need remains for a self-propelled apparatus which safely and efficiently loads and unloads bales of various sizes and shapes without regard for the bales' orientation and position upon the ground in the field, which stacks the bales in an orderly fashion upon a transportation bed for conveyance to storage, and which can also rapidly retrieve bulk stacks from storage for re-transport to a consumption location.

SUMMARY OF THE INVENTION

An object of the invention is to provide an apparatus which reliably grabs articles, such as, large bales of hay upon the ground and loads them upon a transportation bed, with minimal regard for the position of the article relative to the apparatus, a novel and improved transfer mechanism on the bed consisting of a roller guide assembly and stabilizer arms for selectively advancing one or more bales in succession rearwardly along the bed.

Another object of the invention of the present invention is to provide apparatus for both loading and unloading of a plurality of stacked bales to and from a transportation bed in which stabilizer members on opposite sides of the bed are selectively engageable with the bales to prevent their slippage as the bed is tilted from a transportation position to an unloading position.

Another object of the present invention is to provide for a novel and improved operator-controlled transportation bed for selectively advancing bales of hay in ordering stacks along the bed under the complete control of the vehicle driver.

Still another advantage of the invention is that it is adaptable for use on a variety of commercially available vehicles.

In a wheeled apparatus for loading and unloading bales of hay or other like articles onto and from a transportation bed, the improvement comprises roller guide means in a recessed portion of the bed adjacent to a first end for selectively advancing each bale in succession from the first end toward a second end and stabilizer members on opposite sides of the bed including means for selectively tilting each of the stabilizer members between a substantially upright position away from engagement with the bale(s) and a convergent position engaging opposite sides of the bale(s) and wherein tilting means are mounted within a pocket in the bed. A particular advantage and feature of the invention is the ability to selectively engage each bale at a front end of the bed with a roller guide assembly and drive mechanism to advance rearwardly along the bed either alone or in cooperation with side stabilizer members which under the control of the operator are tiltable into engagement with opposite sides of the bale and which are preferably located at the front and rear ends of the bed. Each of the stabilizer members is characterized by having a lower base portion which is slidable within the substantial profile of the bed between an upright position away from the bales and a convergent position engaging opposite sides of the bale(s).

The above and other objects of the present invention will become more readily appreciated and understood from a

DETAILED DESCRIPTION OF PREFERRED EMBODIMENT

The invention relates to an apparatus for loading, transporting, and stacking large objects, most particularly bales of hay. A single operator may use the invention safely and efficiently to load, transport, and unload bales of hay, including but not limited to the common large rectangular sizes of 3'×3'×8' or 4'×4'×8'. In this specification, "bales" means any large object to be loaded and moved, but more particularly baled hay such as parallel piped bales up to about one ton in weight. The figures depict an embodiment of the apparatus, which is operable off-the-road for loading and unloading bales, as well for over-the road use to transport bales between points of loading, storage, and consumption. In a preferred embodiment, the apparatus of the invention is configured for use with a commercially available truck. The invention is readily adaptable for use on the frames of many makes and models of large, typically diesel-powered, heavy-duty trucks. In the specification and claims, the terms "back," "backward," "front" and "forward" are used in their usual sense with respect to a wheeled vehicle; "front" and "forward" refer to the ordinary direction of the vehicle's travel and the leading end of the vehicle facing such direction, while "back" and "backward" refer to the commonly understood opposites.

Figure 1:
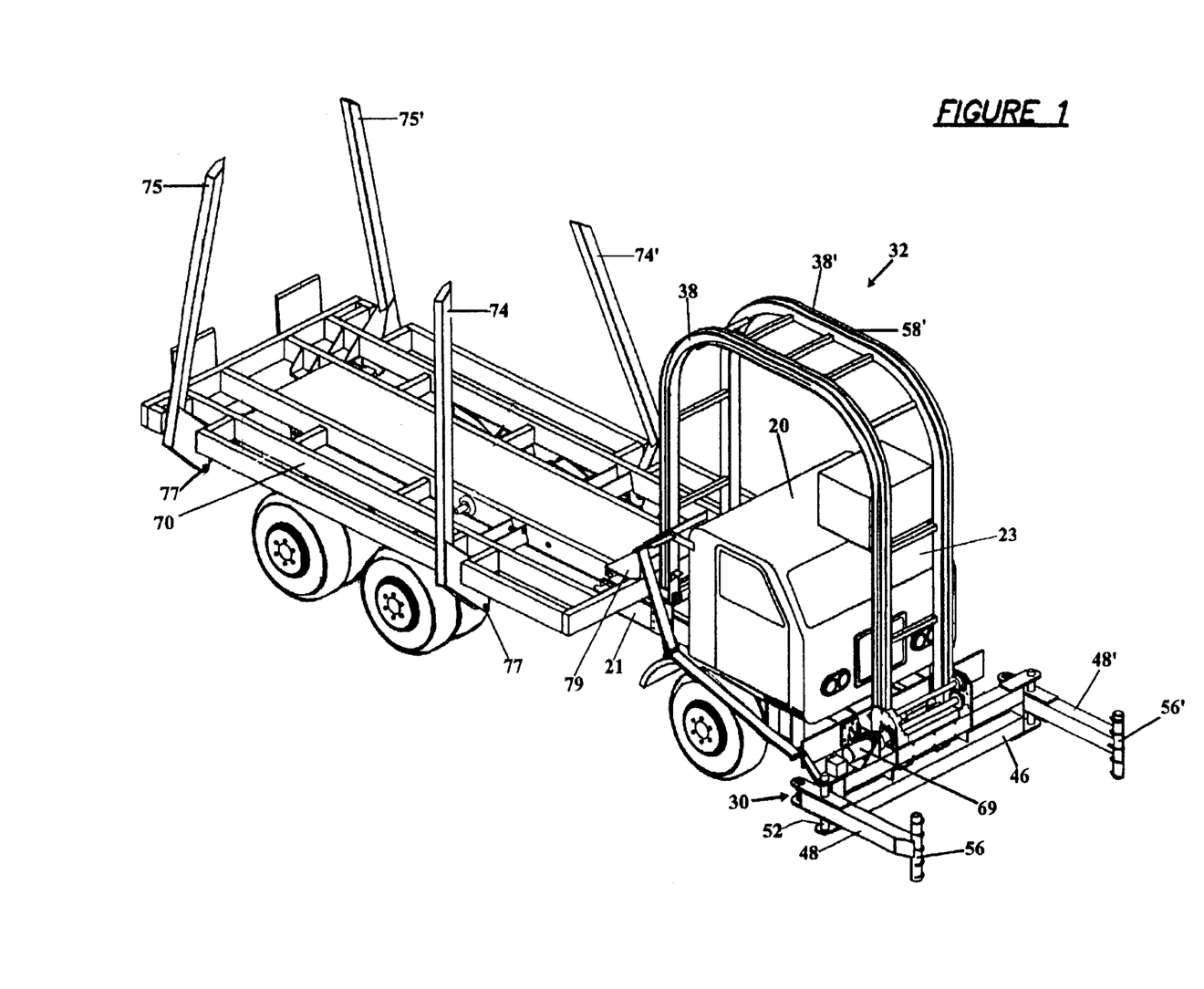
FIG. 1 is a perspective view from above a preferred embodiment of the invention.
Figure 2:
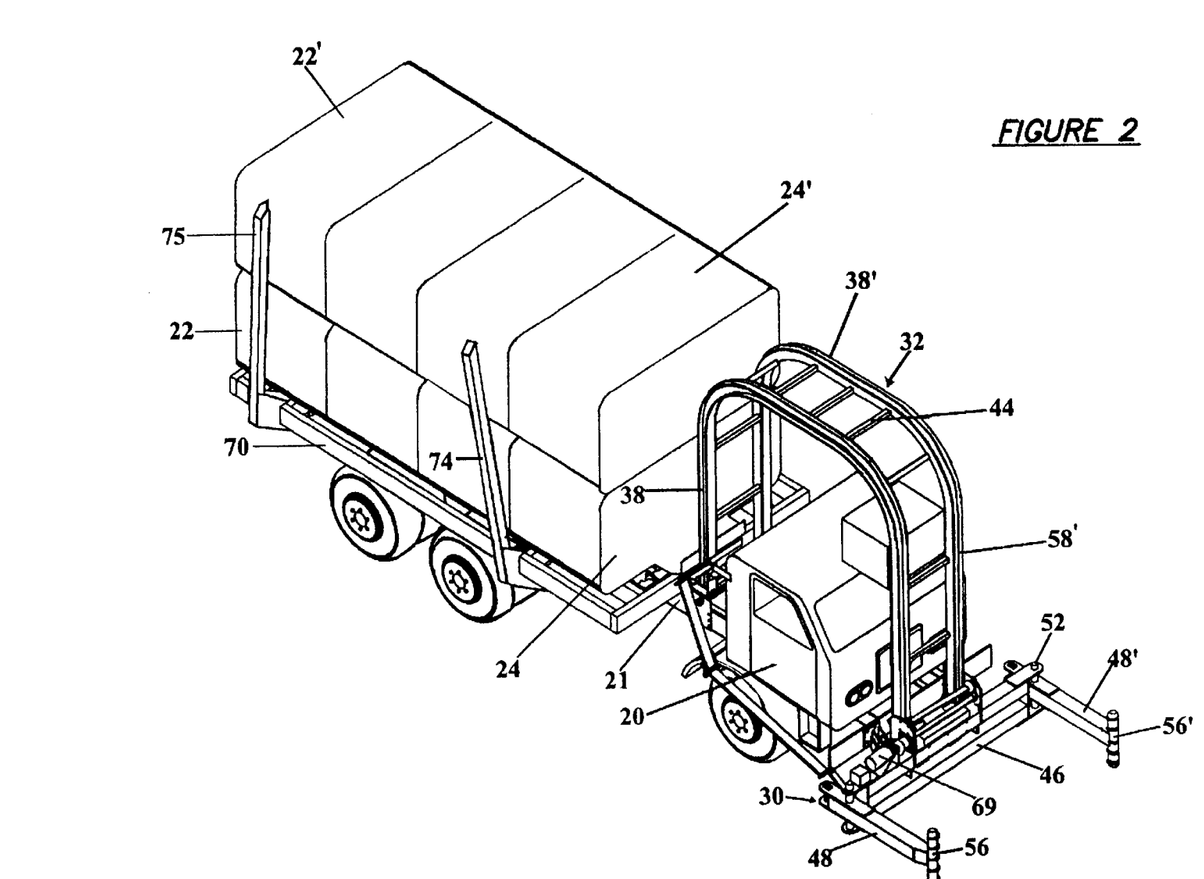
FIG. 2 is another perspective view of the embodiment of the invention shown in FIG. 1, showing eight large bales loaded upon the transportation bed.

Combined reference is made to FIGS. 1 and 2. Broadly described, the invention includes a self-propelled truck vehicle including a passenger cab 20, and bed 70 mounted upon a generally conventional frame 21. The cab 20 contains the operating controls for the overall apparatus, and the front of the cab 20 includes a windshield 23 to permit clear observation of the field and bales during loading, and viewing of the road during on-road transportation. The back of the cab 20 may also feature a small window for observation of the bed 70. A conventional diesel engine (not shown) within the cab 20 directly or indirectly powers the various components of the invention, as well as providing for vehicle locomotion.

The invention includes a number of fluid or hydraulically powered components. Hydraulic power is generated, distributed and transferred, actuated and controlled in generally conventional manners. Accordingly, the invention is provided with a system of hydraulic fluid reservoirs, hydraulic tubes and hoses, and hydraulic piston-and-cylinder components that are known in the art and thus not described in detail or portrayed in detail in the drawings. Such hoses, reservoirs, and the like are located upon the invention and actuated substantially in accordance with known principles of design, except as indicated otherwise herein.

The preferred embodiment includes a pair of steerable wheels-under the cab 20 and tandem wheel beneath the bed 70 for stable rolling movement of the apparatus across fields and highways. The bed 70 is pivotally connected to the frame 21 near the back end of the frame 21 so that the bed 70 may be raised, in dump-truck fashion, from a substantially horizontal position parallel adjacent to the frame 21 and a substantially vertical position generally perpendicular to the frame 21. The invention also includes a bale carriage 30 and carriage track 32 for securely gripping a bale upon the ground and loading it upon the bed 70. The bed 70 has at least one pair, and preferably two pairs, of side arms 74, 74' and 75, 75' used to maintain bales in proper position against the bed 70 during loading/unloading and transportation. FIG. 2 shows the apparatus of the invention in a fully loaded condition, with a plurality of bales 22, 22' neatly stacked upon the bed 70 by operation of the apparatus.

Figure 3:
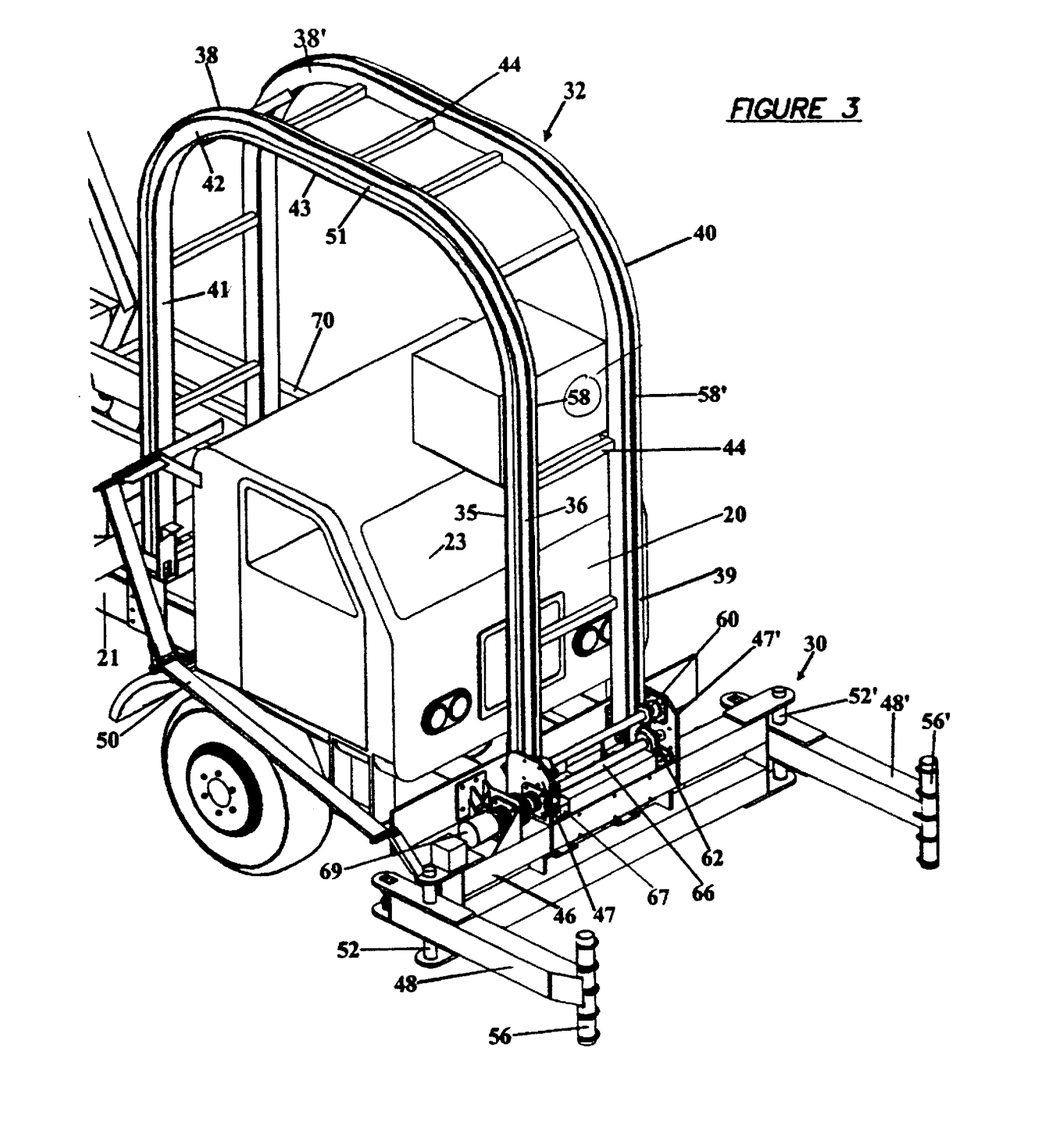
FIG. 3 is an enlarged view of the front portion of the embodiment of the invention shown in FIG. 1, detailing the features of the bale carriage and carriage track components of the invention.

FIG. 3 details elements of the bale carriage 30 and carriage track 32 which operate together to move bales, generally one at a time, from the ground to the bed 70. Bale carriage 30 permits a bale to be securely gripped in a position aligned with the bed 70, and, in operative conjunction with the carriage track 32, loads the bale upon the bed in an orderly manner without substantially affecting the stability of the vehicle. A given bale is loaded without having to grip and release the bale more than once, and the use of a strong, fixed, stable carriage track 32 permits the operator to observe the loading process without the distraction of having to perform a complex series of control commands.

Carriage track 32 preferably comprises a pair of high-strength steel rails 38, 38' in braced, spaced-apart relation. Each of the rails 38, 38' is composed of high strength steel alloy and preferably has a U-shaped or I-shaped cross section. Thus, each rail 38, 38' comprises a channel-shaped member, with inner and outer sides 35, 36 defining a channel 51 therebetween. The open end of the rail 38, 38' is the channel 51 faces laterally outward toward the sides of the vehicle, while the closed ends or backs 37 of the rails 38, 38' face laterally inward in affronting relation. Rigid braces 44, 44' extend horizontally between the closed ends of the rails 38, 38 to maintain their braced spaced-apart relation. The ends of each of the rails 38, 38' are rigidly and securely fixed to the frame 21 of the vehicle. As the figures show, the rails 38, 38' overarch the cab 20 from front to back. The rails 38, 38' are essentially the same in form and function, so that description of one serves to describe both. Each rail preferably includes a substantially vertical front portion 39 securely attached to the front of the frame 21, a front arcuate portion 40 at the upper end of the front portion 39, a substantially vertical back portion 41 securely fixed to the frame 21 in back of the cab 20, a back arcuate portion 42 at the upper end of the back portion 41, and an intermediate, preferably horizontal, intermediate portion 43 connecting the two arcuate portions 40, 42. Each rail thus defines an arch shape anchored to the frame in front and in back of the cab 20. The preferred arch shape is that just described, but alternative arch shapes may suffice, and may include for example an true semicircle atop two vertical legs. In all embodiments, the carriage track provides a rigid structure upon which the weight of the bale is stably supported during loading—in contrast to prior art devices which rely exclusively upon hydraulic pressure actuated arms to sustain the weight of a raised bale.

Figure 3A:
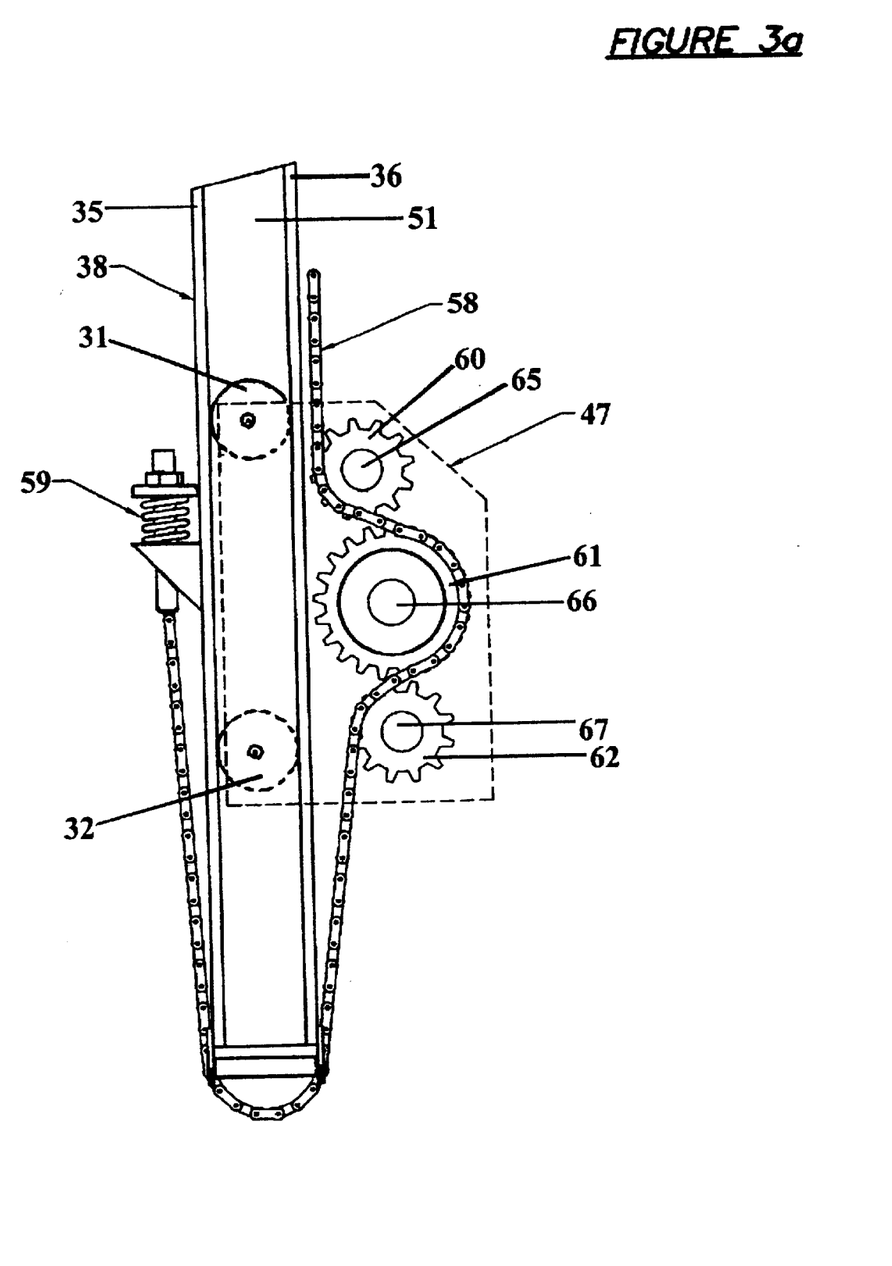
FIG. 3a is an enlarged, somewhat schematic side view in elevation of a certain portion of the embodiment shown in FIG. 3, with portions broken away to show the spring attachment of a chain to a carriage track, and the engagement between drive sprockets and a traction chain.

Bale carriage 30 is movable along substantially the entire length of each of the rails 38, 38'. The bale carriage 30 broadly comprises an elongated, rigid, horizontal backstop 46 slidably connected to the rails 38, 38', and at least two grabber arms 48, 48' pivotally connected to the backstop 46, preferably at opposite ends thereof. The backstop 46 of the carriage 30 may comprise a pair of horizontal beams in vertically spaced apart relation, as seen in the figures, but alternative horizontal backstop structures are within the scope of the invention. Sliding or rolling connection of the backstop 46 to the rails may be provided by keys, or, preferably, wheels 31, 31' rotatably disposed upon or extending from the flanges 47, 47' mounted to the backstop 46. As best seen in FIG. 3a, for example, a pair of wheels 31, 31' are rotatably mounted upon axles extending from the inside of the flange 47 and smoothly roll along and within the confining channel 51 in between the inner side 35 and the outer side 36 of each of respective rails 38, 38'. The wheels 31, 31 roll along and with the in the channel 51 to control the movement of the bale carriage 30 and bear the weight of the bale while the bale moves along the intermediate portion 43 of each rail.

Grabber arms 48, 48' have a hinged connection to the backstop 46 preferably by means of capped pivot pins 52, 52' passing through each grabber arm and flanged ends of the backstop 46. As seen in FIG. 3, the pivot pins 52, 52' pass through respective grabber arms 48, 48' at intermediate positions somewhat removed from the proximate ends of the grabber arms. Hydraulically powered piston and cylinder systems 54, 54' extend between the proximate ends of the grabber arms 48, 48' and the backstop 46 to provide powered pivotal movement of each grabber arm about its respective pivot pin. Hydraulic hoses (not shown) may be disposed upon an articulated hose rack 50 to supply hydraulic power to the movable bale carriage 30. As the proximate ends of the grabber arms 48, 48' are moved reciprocally by the powered cylinders 54, 54', the distal gripper ends 56, 56' of the grabber arms 48, 48' move toward and away from each other. The gripper ends 56, 56' extend perpendicularly from upper and lower sides of the grabber arms 48, 48, as seen in FIGS. 1–3.

The bale carriage 30 moves along the carriage track 32 during loading and unloading. A series of apertures or indentations are serially disposed at uniformly spaced intervals along one or more fixed lines running the length of the carriage track 32 as a means for providing the traction for movement, while a driver upon the bale carriage 30 consecutively engages and pushes against successive indentations to move the carriage along the track. In a preferred embodiment, very heavy duty steel linked chains 58, 58' are disposed along the length of each of the rails 38, 38', as shown in FIGS. 3 and 3a. The chains 58, 58' are substantially identical in form and function, such that the description of one serves to describe the pair. One end of each chain 58 is attached to the end of the rail 38 in back of the cab 20, while the other end of the chain is attached to the opposite end of the rail 38 in front of the cab. Most preferably, at least one end, and optionally both ends, of each chain 58 is attached to a corresponding rail 38 by a high tension spring 59 as seen in FIG. 3a. The disposition of a spring 59 between the end of the chain 58 and the immobile rail 38 provides limited longitudinal shifting of the chain while yet securing the chain against permanent or significant displacement either laterally or longitudinally. The open sides of the serial links of the chain 58 define a line of mostly immovable apertures with which the driving mechanism on the bale carriage 30 consecutively may engage to move the carriage up and over the cab 20.

Combined reference is made to FIGS. 3 and 3a (with the front of the inventive apparatus towards the right side of FIG. 3a). The bale carriage 30 mounts a driving mechanism to provide for the powered movement of the bale carriage 30 along the rails 38, 38' of the carriage track 32. A preferred embodiment includes at least two circular sprocket gears having a plurality of teeth insertable into successive links of corresponding chains 58 as the sprocket gears simultaneously rotate. Most preferably, and as indicated in FIG. 3, the bale carriage 30 mounts a pair of plural sprocket arrangements, one arrangement operatively engageable with each of the traction chains 58, 58'. FIG. 3a is a sectional side view depicting a single preferred plural gear arrangement according to the invention, and description of one of the arrangements adequately describes both arrangements, one arrangement corresponding to each chain 58, 58'.

The backstop 46 rigidly mounts a journal box including at least a pair of bearing flanges 47, 47' supporting horizontal shafts 65, 66, and 67 for powered rotation. Each of the shafts 65, 66, 67 has a pair of sprockets fixed thereon for engagement with a respective one of the chains 58, 58'. At least one of the shafts 65, 66, 67, preferably the middle shaft 66, is operatively connected to a motor, preferably a hydraulic motor 69 disposed upon the bale carriage 30, whereby the drive shaft 66 may be rotated under power. Powered rotation of the drive shaft 66 imparts rotary motion to the two sprockets mounted thereon, resulting in the sprockets' engagement with successive portions of the mostly immobile chain 58 or 58'. The rotational rates of the shafts 65, 66, 67 and the respective diameters of the sprockets 60, 61 62 are deliberately coordinated to equalize the absolute rotational velocities of the peripheral toothed edges of the sprockets, to permit a chain 58 to be engaged with all three rotating sprockets simultaneously as described below.

FIG. 3a shows a preferred arrangement of three toothed sprockets 60, 61, and 62 engageable with chain 58. Another substantially identically arranged set of sprockets interact with the other chain 58' in substantially the same way, so that description of one set of sprockets 60, 61, 62, describes as well the other set engaged with the chain on the second rail 38'. Sprockets 60, 61 and 62 are vertically mounted, and horizontally aligned, upon corresponding horizontal shafts 65, 66, and 67 as described. The middle drive shaft 66 is journaled in a position offset from the plane containing the top shaft 65 and the bottom shaft 67. The circumferential teeth of the respective sprockets 60, 61, and 62 do not inter-engage, but rather are spaced apart to permit the chain 58 to be disposed in a serpentine manner about the three sprockets as shown in the figure. The chain 58 is disposed in contact with the rail 38 throughout its length, except where the chain 58 is pulled away from the rail 38 to run between the top sprocket 60 and the middle sprocket 61 to run around the middle sprocket 61 and then pass between the middle sprocket 61 and the bottom sprocket 62 to return to a position substantially adjacent or in contact with the rail 38. Because the chain 58 is mostly fixed in longitudinal position, the powered rotary motion of the drive sprocket 61 causes all the sprockets to move along the chain 58 as the teeth of the sprockets consecutively engage the links of successive portions of the chain. The resulting driving force is transmitted through the shaft 66, to the bearing flanges 47, 47', causing the entire bale carriage 30 to creep or move along the substantially immobile chain 58. The drive sprocket 61 and follower sprockets 60, 62 are so arranged as to provide therebetween a serpentine path for the chain 58 permit sprocket engagement into both sides of the chain to prevent the sprocket teeth from slipping, while yet permitting the chain to hug the rail 38 for most of its length while the bale carriage 30 moves along the chain.

Figure 4:
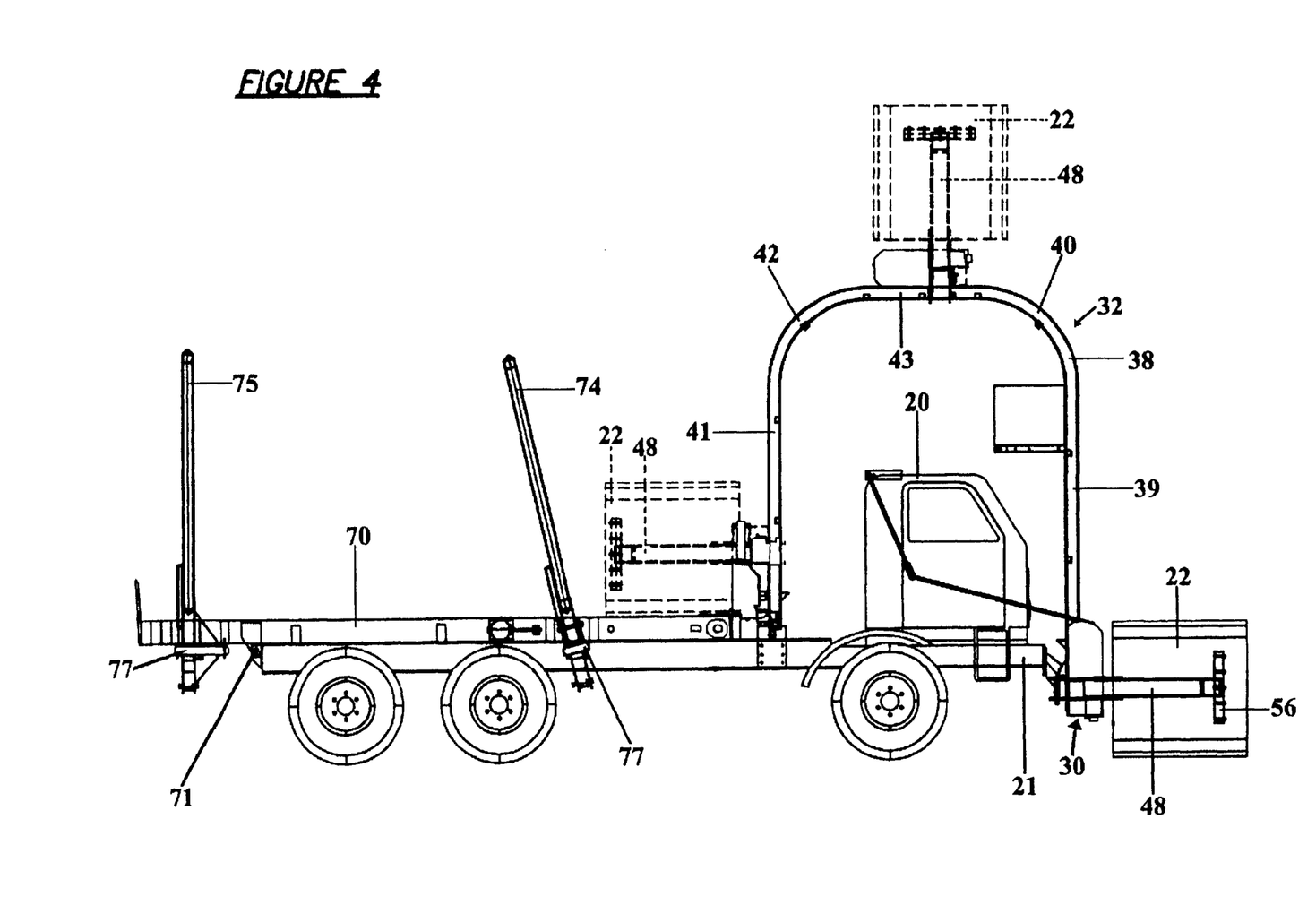
FIG. 4 is a side view in elevation of a preferred embodiment of the invention, with phantom lines depicting the movement of a bale from a position in front of the apparatus to a position loaded upon the bed of the apparatus.

Controlled operation of the motor 69 therefore permits the operator to move the bale carriage 30 from a first position in front of the cab 20 to a second position in back of the cab 20 and proximate to the bed 70, as suggested by the solid and phantom lines of FIG. 4. A bale 22 resting on the ground may be secured by the bale carriage 30 in the first position shown in solid lines in FIG. 4. The pair of sprocket arrangements are substantially identical, and being affixed to commonly shared shafts 65, 66, and 67, operate at identical speeds. With the controlled actuation of the motor 69 on the bale carriage 30, the sprockets engaged with each chain 58, 58' rotate in the directions indicated by the directional arrows of FIG. 3a, causing the bale carriage 30 to climb steadily up the chain 58 running along the front of the front portion 39 of the rail 38. Both sprocket arrangements move along the chains 58, 58' at the same rate, thus keeping the backstop 46 at all times substantially parallel with the ground and the overall bale carriage 30 well-balanced.

As the rising bale carriage 30 approaches and passes the front arcuate portion 40 of each of the rails 38, 38', some flexibility in the effective length of the chains 58, 58' is provided as each spring 59 extendably yields to permit the rotating sprockets 60, 61, 62 to round the "corner" between the front portion 39 and the intermediate portion 43. Continued driving of the sprocket 61 moves the bale carriage 30 and bale 22 across the preferably horizontal intermediate portion 43 of the rails 38, 38', as suggested by the uppermost phantom lines in FIG. 4.

As indicated by the left-most phantom lines of FIG. 4, the user ordinarily continues the operation of the motor 69 and the sprocketed drive assemblies until the bale carriage 30 attains a position proximate to the bed 70, at which time the motor 69 may be clutched or otherwise disengaged to discontinue movement of the carriage 30 to allow the bale 22 to be deposited upon the bed 70, as shall be further explained. Once the bale 22 has been loaded upon the bed 70, the motor 69 is operated in reverse and engaged to reverse the rotary motion of the sprockets 60, 61, 62. The empty carriage 30 consequently climbs back up the back portion 42 of the rails 38, 38', crosses the intermediate portion 43, and descends the front portion 40 to again be in position to secure another bale.

While the bale 22 is passed from in front of the cab 20 toward the bed 70, the weight of the bale 22 is borne by the rigid substantially vertical front and back portions 39, 42, of the rails 38, 38', rather than solely by some combination of hydraulic cylinders, or heavily tensioned cable systems, or the like, as commonly encountered in the art. The apparatus of the invention therefore moves the load from the ground in front of the vehicle to the loading bed 70 in a dependable manner.

Reference is made to FIGS. 1, 2 and 4 showing the elongated flat bed 70 in horizontal position upon the frame 21 behind the cab 20. The bed 70 is a conventionally planar platform upon which bales 22, 22' may be loaded for transportation as shown in FIG. 2. The bed 70 may be provided with a solid continuous deck, or, as shown in the drawings, may feature a framed, semi-open construction whereby the bales are adequately supported upon parallel rails. An advantage of the present invention is that the bed 70 also is operable to perform stacked loading and unloading functions to be further described.

Figure 7:
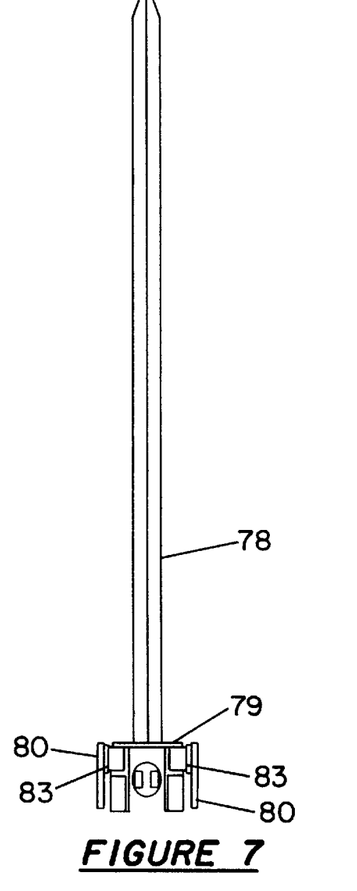
FIG. 7 is an end view of the stabilizer member shown in FIGS. 5 and 6.
Figure 8:
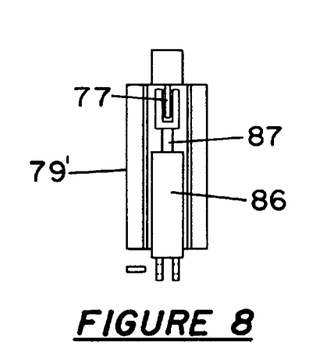
FIG. 8 is a bottom view of the base of the stabilizer member in a first inboard position.
Figure 9:
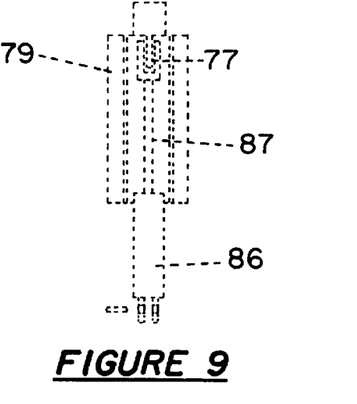
FIG. 9 is a view corresponding to FIG. 8 but illustrating the base of the stabilizer member in an outboard position.

The bed 70 is pivotally connected to the back end of the frame 21 by means of two or more conventional pin-and-flange mechanical hinges 71. One or more hydraulic cylinder systems, not shown, known in the art connect the intermediate portion of the bed 70 to an intermediate portion of the frame 21, so that controlled actuation of the hydraulic cylinder systems selectively raises and lowers the forward portion of the bed 70 in a manner suggestive of the operation of a typical "dump truck" and similar, for example, to the tiltable bed device described in U.S. Pat. No. 4,329,101 to Green, et al. The bed 70 thus is selectively pivotal about the hinge connection 71 between a substantially horizontal position as shown in phantom lines in FIG. 7 and a substantially vertical position as depicted by the solid lines of that figure.

In the alternate form shown in FIG. 5 to 9, the invention includes at least one pair, and preferably two pairs, of upstanding side arms 74 and 75 pivotally mounted on opposite sides of the bed 70, the side arms 74 and 75 acting as fencing members to hold loaded bales 22, 22' in place upon the bed 70 as well as to perform a gripping or clamping function to assist in loading and unloading of stacked bales under the control of cylinder mounts 77 beneath the bed 70. In the alternate form of invention shown in FIGS. 5 to 9, each of the side arms 74 and 75 is of generally L-shaped configuration having a longer upright or vertical bar portion 78 and a shorter horizontal base portion 79', the latter being pivotally mounted within a side pocket 80 in the bed. In this relation, there are a pair of side pockets 80 on opposite sides of the bed at the front end and at the rear end, and each horizontal base portion 79' includes a channel 82 in which spaced rollers 83 are disposed to permit the base 79' to advance from a slightly divergent angle away from the bed, as shown in full in FIG. 6, to a somewhat convergent angle as shown in dotted form in FIG. 6. Each of the rollers 83 is journaled on an axle in the side of the pocket 80, and each of the side arms 74 and 75 is advanced under the control of a hydraulic cylinder 86 extending from the closed end of the pocket 80 into the base 79 with a cylinder rod 87 to advance and retract the base 75 and impart a tilting motion to the base portion 79 between the divergent and convergent angles as described.

Figure 5:
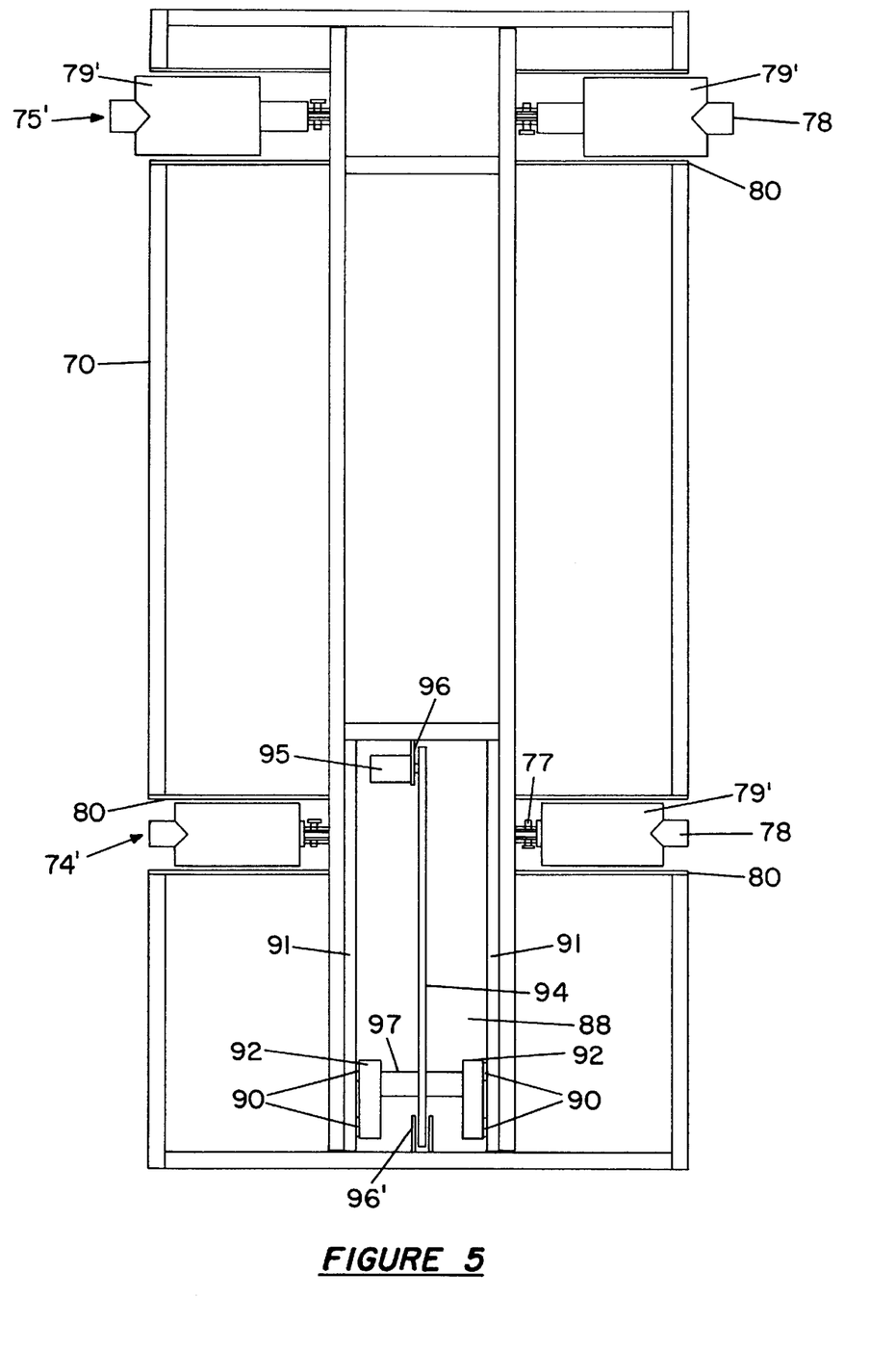
FIG. 5 is a plan view of an alternative form of transportation bed in accordance with the present invention.
Figure 6:
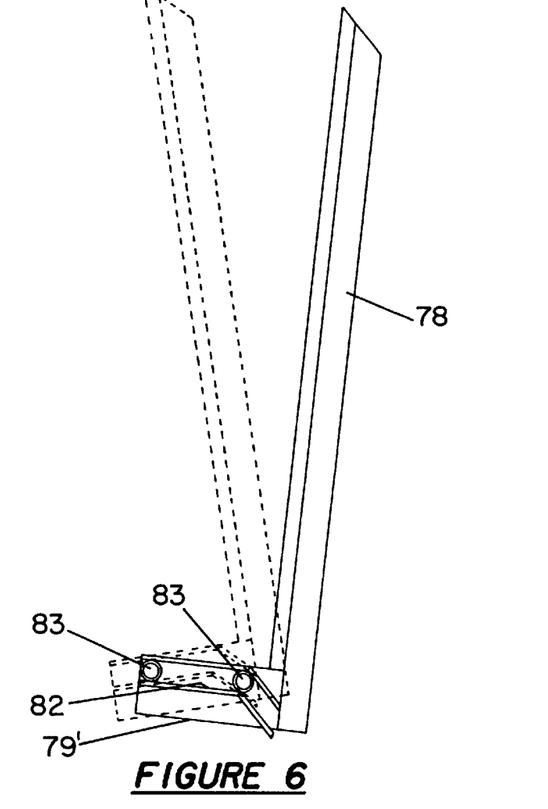
FIG. 6 is a side view of an alternate form of stabilizer member mounted in a pocket of the transportation bed and showing the stabilizer member in an outboard and inboard position.

In order to advance each successive bale 22, 22' rearwardly when it is placed on the bed 70, a novel and improved form of bale bed advancement device includes a roller guide assembly mounted in an elongated recessed area 88 centrally of the forward end of the bed 70, as shown in FIG. 5. The roller guide assembly comprises pairs of rollers 90 on opposite sides of the recessed area 88 and elongated guide tracks 91 on opposite sides of the area 88 between the rollers 90. Further, each of the pairs of rollers 90 is interconnected by a common web 92 which projects above the surface of the bed 70. A chain drive 94 extends along the length of the recessed area 88 including a drive motor 95 into a drive sprocket 96 at one end and a follower sprocket 96' at the opposite end. A push plate 97 is attached to the chain including an upright flange 98 to engage each successive bale 22, 22' deposited on the bed and advanced rearwardly by activation of the chain drive. When the bale clears the powered end of the chain drive, the chain drive 94 is reversed to return the push plate 97 to its starting point.

By way of further disclosure and description, a manner of practicing the invention shall be described. To begin the process of retrieving and loading a bale, the hydraulic motor 69 on the bale carriage 30 is selectively operated to move the bale carriage 30 down to the bottom of the front portion 39 of the rails 38, 38', to a first position substantially proximate to the front of the cab 20, as depicted in FIGS. 1 and 3. As the apparatus approaches the bale 22, the operator actuates, e.g. contracts, the hydraulic grabber cylinders 54, 54' to pivot the gripper ends 56, 56' of the grabber arms 48, 48' to a maximally spaced-apart position. The operator drives the vehicle forward toward the bale 22 until the backstop 46 comes in contact with the bale 22. A notable advantage of the invention is that no part of the apparatus must slide under or penetrate the bale 22, and the continued movement of the vehicle pushes the bale 22 into the aligned position in flush contact with the backstop 46.

Once the bale 22 is in contact with the backstop 46, forward locomotion of the vehicle across the ground may be discontinued, if desired, during the loading of the bale onto the bed 70. It is not necessary to stop the vehicle for loading and the operator may activate the bale carriage 30 and commence loading while continuing to pilot the vehicle across the field toward another bale. The operator activates and extends the hydraulic cylinder assemblies 54, 54' powerfully to pivot the gripper ends 56, 56' of the arms 48, 48 toward each other. The grabber arms 48, 48' swing into position against the sides of the bale 22 and securely grasp the bale 22 in a sideways vice-like grip. Gripper ends 56, 56', provide a more secure grip upon the bale 22 by broadening vertically the contact of the grabber arms 48, 48' with the bale 22.

Reference is made to FIG. 4, showing a side view of the grabber arms 48, 48' securely gripping the bale 22 therebetween in the first position in front of the cab 20 and proximate to the front end of the frame 21 of the vehicle. The operator actuates the hydraulic motor 69 on the bale carriage 30 to initiate the rotation of the sprockets 60–62. To raise the carriage 30, and thus bale, from the ground, the top sprocket 62 is rotated in the counterclockwise position as seen in FIG. 3a, the middle sprocket 61 rotates in the clockwise direction, and the bottom sprocket 62 rotates in the counterclockwise direction. As the sprockets 60–62 rotate under power from the motor 69, teeth on each of the sprockets consecutively engage or mesh with successive portions of corresponding traction chains 58, 58', thereby driving the bale carriage 30 along the chains and resulting in the bale carriage climbing upward along the front portions 39 of the rails 38, 38'.

The upward progress of the carriage 30 with the bale 22 secured therein is monitored by the operator from his position in the cab 20. Continued operation of the motor 69 drives the carriage 30 to the top of the vertical front portions 39, around the front arcuate portions 40, and to the intermediate portion 43 of the rails 38, 38'. The uppermost phantom lines in FIG. 4 show the bale 22 in transit across the intermediate portion 43 of the rails. Notably, the weight of the bale 22 is supported at all times, and particularly when the bale 22 is above the cab 22, by the strong, unmoving rails 38, 38'. The bale's accidentally dropping upon the cab 20 due to hydraulic pressure failure, operator error, or other mishap thus is virtually impossible. The operator nevertheless at nearly all times is able to view the progress of the bale 22 along the rails 38, 38'. As the bale carriage 30 continues moving along the chains 58, 58', it rounds the corners between the intermediate portions 43 and the back portions 41 of the rails 38, 38'. The carriage 30 then descends the back portions 42 until the carriage 30 and bale 22 attain a second position substantially adjacent to the back of the cab 20, as shown by the left-most set of phantom lines in FIG. 4. As FIG. 4 shows, the bottom ends of the back portions 41 of the rails 38, 38' are fixed to the frame 21 at a location on the frame between the cab 20 and the bed 70. It is seen therefore, that the overarching character of the rails 38, 38, permits the carriage 30 to move from a first position in front of the cab 20 to a second position in back of the cab 20. A bale 22 releasably secured by the grabber arms 48, 48' consequently is moved from a position upon the ground in front of the vehicle, is rotated about 180° in space during transit along the rails 38, 38', and is deposited upon the bed 70. Some extension in the length of the traction chains 58, 58' may be necessary as the bale carriage 30 bearing the bale 22 moves around the arcuate portions 40, 42 of the rails, which adjustment is accommodated by the extension and retraction of the springs 59 connecting the chains 58, 58' to the rails 38, 38'.

With the bale upon the bed 70, the operator contracts the gripper cylinders 54, 54' to release the grabber arms 48, 48' from the bale 22. The motor 69 is again actuated, in reverse, to drive the sprockets 60–62 in an opposite rotation to move the carriage 30 up the back portions 41 of the rails 38, 38' and down the front portions 39 to return to the original, first position where it is restored to a position to grab another bale. The process is then repeated to load bales one at a time upon the bed 70 until all bales are retrieved or the bed 70 is filled to capacity. The advantageous arrangement of the sprockets 60, 61, and 62 as seen in FIG. 3a, wherein at least two sprockets (e.g. top sprocket 60 and middle sprocket 61) engage the chain 58 from opposite sides of the chain, permits the carriage 30 to be driven in either direction along the rails 38, 38', even when loaded, without significant threat of slippage or disengagement of the sprockets from the chain.

As each bale 22 in turn is deposited upon the bed 70 by the bale carriage 30, the plate 97 is between the bale 22 and the cab 20, and the bale 22 is at the front end of the bed. The push plate 97' is activated after stacked pairs of bales 22, 22' have been loaded. Preferably, a first bale 22 is loaded directly upon the bed 70 by means of the bale carriage 30 as previously described. The operation of the bale carriage 30 is repeated to stack a second bale 22' upon the first bale 22, so that two bales are vertically stacked at the front of the bed 70 as depicted in phantom lines in FIG. 8. The operator then engages the hydraulic motor 95 thereby rotating the sprockets 96 and 96' and advance the plate 97 from the front of the bed 70 toward the back of the bed to shift both bales 22, 22' from a position at the front of the bed 70 to an intermediate position upon the bed. The operator then selectively reverses the direction of operation of the motor 95 in rotating the sprockets 96, 96' to return the plate 97 to the forward position, leaving the bales 22, 22' in the rearward position upon an intermediate portion of the bed 70. Subsequently deposited stacked pairs of bales are pushed back toward the back of the bed 70 in the same manner, with recently deposited pairs of bales pushing earlier deposited bales, until the first deposited pair 22, 22' has been pushed to the back end of the bed 70 to make room for the finally loaded pair of bales 24, 24' at which time the bed 70 is fully loaded as seen in FIG. 2. It will be readily apparent that the process may be similarly performed upon smaller bales by stacking smaller bales three or four bales deep, and operating the plate 97 after every third or fourth bale has been vertically stacked.

Side arms 74' and 75' act as side stakes or fences to prevent the loaded bales 22, 22', 24, 24' from falling from the bed 70, as indicated by FIG. 2. Additionally, the side arms 74', 75' enable the operator selectively to grip the loaded bales to hold them in position upon the bed 70 while the vehicle transports the bales along a road, and also when the bed is tilted to load and unload the bales. With the bed 70 fully loaded as shown in FIG. 2, the apparatus of the invention may be driven off the hay field and upon improved or unimproved roads to transport the full load of bales to the place of storage.

Prior to or upon arrival at the desired unloading location, therefore, the operator actuates the hydraulic cylinders driving the side arms 74', 75' to move constituent members of each pair of side arms toward each other to positions of reduced separation distance, forcibly to squeeze or clamp therebetween the loaded bales 22, 22', 24, 24'. This clamping or gripping action of the side arms 74' and 75' occurs while the bed 70 and loaded bales are in the horizontal position shown in phantom lines in FIG. 7. The compressive force of the pairs of side arms 74' and 75' is sufficient, however, to hold the loaded bales in position against the bed 70 even when the bed is tilted from the horizontal.

In order to unload the bales 22, 22', the bed 70 is tilted until the bed 70 and bales have rotated from the horizontal position to a vertical position until the loaded bales 22, 22' are immediately above or actually against the ground. The hydraulic piston-and-cylinder mechanisms driving the side arms 74' and 75' are actuated in reverse to retract the members of the pairs of side arms 74 and 75 away from one another, thereby releasing their grip upon the bales 22, 22'. The bales are thereby unloaded from the bed 70 in a single, simple operation of the tiltable bed 70. The hydraulic system employed to tilt the bed 70 is then selectively operated controllably to restore the bed 70 to the horizontal position adjacent to the frame 21, thereby leaving all the bales neatly stacked upon the ground. The apparatus of the invention may then be driven away to retrieve another load of bales. Notably, the entire loading and transportation activity may be performed by a single operator, thus reducing labor costs.

In order to retrieve and load stacked bales, the apparatus of the invention is driven to the storage location. The operator activates the hydraulic systems moving the side arms 74' and 75' to drive the side arms to their respective maximally separated positions. The bed 70 is tipped to the vertical position shown in FIG. 7, and the apparatus driven in reverse to back up against the stacked bales. The vehicle is backed until the vertical bed 70 is substantially in flush contact against the stack of bales 22, 22' and the stack is disposed between the members of the respective pairs of side arms 74' and 75'. The hydraulically powered systems for moving the side arms 74' and 75' are then reactivated to powerfully pivot the members of the pairs of side arms 74' and 75' toward one another thereby to forcibly grip or squeeze therebetween the vertical stack of bales 22, 22".

With the side arms 74' and 75' securely gripping the stack of bales, the operator controllably engages the hydraulic systems for powered tipping of the bed 70 to pivot the bed 70 from the vertical position. The front pair of side arms 74' are obliquely positioned with respect to the bed 70 to provide an added measure of leverage and security to the clamping actions of the side arms 74' to improve the performance of the described bulk loading process. Once the bed 70 has been restored to the horizontal position, the invention may be operated to transport the bales to some more or less remote location, where the unloading process is performed substantially as previously described herein.

It is therefore to be understood that while preferred forms of invention have herein been set forth and described, various modifications and changes may be made in the construction, arrangement and composition of parts without departing from the spirit and scope of the present invention as defined by the appended claims and reasonable equivalents thereof.

I claim:

1. In a wheeled vehicle for loading, transporting and unloading bales wherein an elongated bed is disposed upon a wheeled frame, said bed having a first end and a second end, and means for successively advancing said bales onto said first end, the improvement comprising:

said bed including an elongated recessed portion in said first end extending lengthwise of an intermediate portion of said bed, laterally spaced guide tracks extending longitudinally of said recessed portion on opposite sides thereof and beneath a top surface of said bed, laterally spaced rollers movable along said guide tracks beneath the top surface of said bed, a pusher member extending upwardly from said bed, reversible drive means daringly connected to said rollers beneath said bed for reversibly advancing said rollers along said guide tracks, and means interconnecting said rollers and said pusher member to follow advancement of said rollers along said guide tracks whereby to selectively advance said pusher member against each said bale in succession from said first end toward said second end; and stabilizer members on opposite sides of said bed including means for selectively tilting each of said stabilizers between a substantially upright position away from engagement with said bale(s) and a convergent position engaging opposite sides of said bale(s) and wherein said tilting means is mounted within a pocket in said bed.

2. In a wheeled vehicle according to claim 1 wherein each of said stabilizer members is of generally L-shaped configuration having an upwardly extending elongated arm and a substantially horizontally extending base portion disposed within said pocket.

3. In a wheeled vehicle according to claim 2 wherein roller means is disposed in each of said pockets for guiding advancement of each said base portion between said upright and convergent positions.

4. In a wheeled vehicle according to claim 3 wherein each of said base portions includes a guide track engageable with said roller means to advance said upright arm between the upright and convergent positions.

5. In a wheeled vehicle according to claim 4 wherein each of said pockets includes drive means for advancing said base portion through said pocket in a direction normal to the length of said bed.

6. In a wheeled vehicle according to claim 5 wherein said drive means includes a fluid-actuated cylinder extending between said roller means.

7. In a wheeled vehicle according to claim 1 wherein said drive means includes a chain drive extending longitudinally of said bed intermediately between said rollers.

8. In a wheeled vehicle according to claim 7 wherein said pusher member is in the form of an upstanding push plate engageable with each said bale in succession to advance rearwardly toward said second end.

9. In a wheeled vehicle for loading, transporting and unloading bales wherein an elongated tiltable bed is disposed upon a wheeled frame, said bed having a first end and a second end, and means for successively advancing said bales onto said first end of said bed, the improvement comprising:

laterally spaced rollers movable along laterally spaced guide tracks in a recessed portion beneath a top surface of said bed adjacent to said first end, a push plate extending upwardly from said rollers, and drive means driving connected to said rollers for selectively advancing said pusher plate against each said bale in succession from said first end toward said second end; and stabilizer members on opposite sides of said bed including means for selectively tilting each of said stabilizer members between a substantially upright position away from engagement with said bale(s) and a convergent position engaging opposite sides of said bale(s) and wherein said tilting means is mounted within a pocket in each of said opposite sides of said bed.

10. In a wheeled vehicle according to claim 9 wherein each of said stabilizer members is of generally L-shaped configuration having an upwardly extending, elongated arm and a substantially horizontally extending base disposed within each said pocket, and roller means in each of said pockets for guiding advancement of each said base portion between said upright and convergent positions.

11. In a wheeled vehicle according to claim 10 wherein each of said base portions includes a guide track engageable with said roller means to advance said upright arm between the upright and convergent positions.

12. In a wheeled vehicle according to claim 11 wherein each of said pockets includes drive means for advancing each said base portion through said pocket in a direction normal to the length of said bed.

13. In a wheeled vehicle according to claim 12 wherein said tilting means includes a fluid-actuated cylinder extending between said roller means.

14. In a wheeled vehicle according to claim 12 wherein said drive means includes a chain drive extending longitudinally of said recessed portion in said bed intermediately between said rollers, there being a pair of said rollers extending along each said guide track, a web member interconnecting each said pair of rollers, and said push plate interconnecting said web members and extending upwardly therefrom.

* * * * *